March 16, 1954   B. R. HALPERN   2,672,197
PAPER-CUTTING MACHINE
Filed Feb. 2, 1950   5 Sheets-Sheet 1
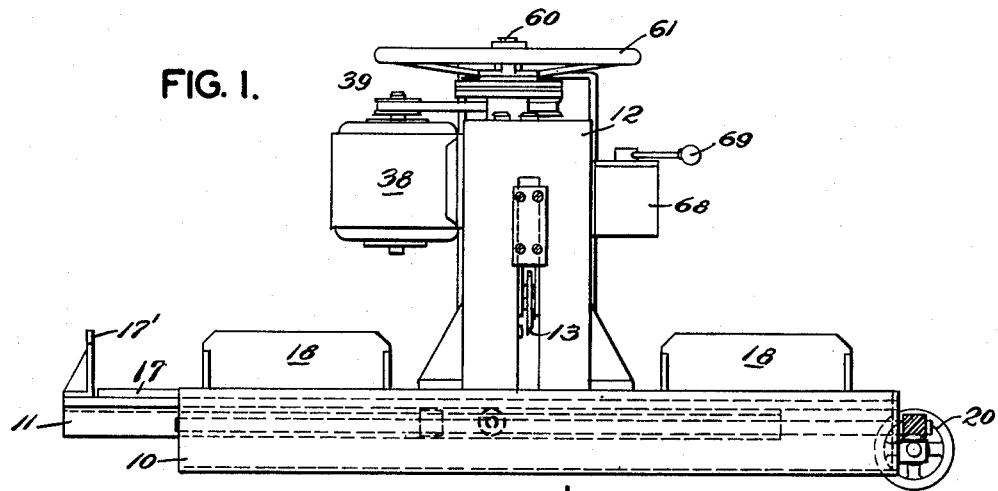
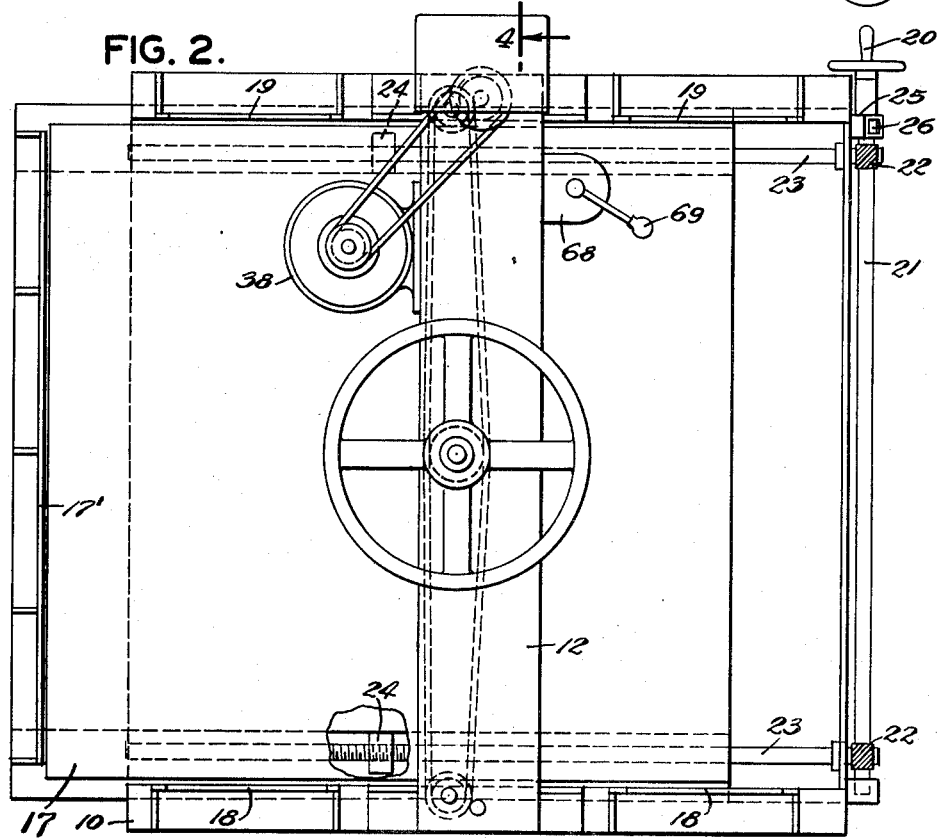
INVENTOR.
BERNARD R. HALPERN
BY
Philip S. McLean
ATTORNEY March 16, 1954   B. R. HALPERN   2,672,197
PAPER-CUTTING MACHINE
Filed Feb. 2, 1950   5 Sheets-Sheet 2
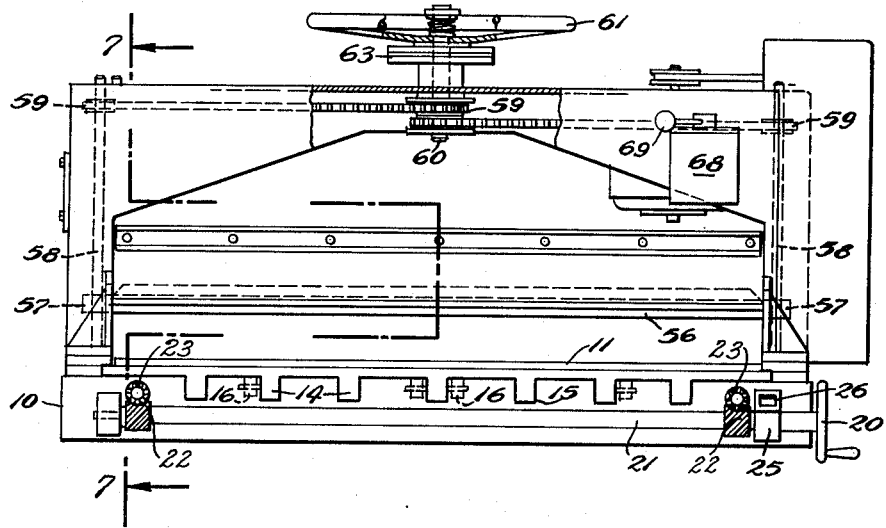
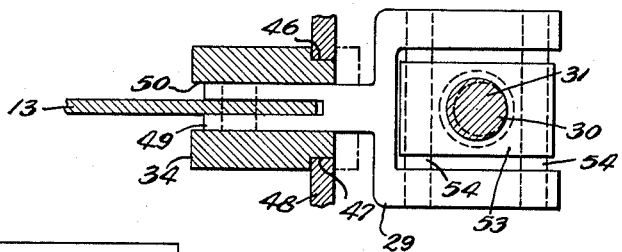
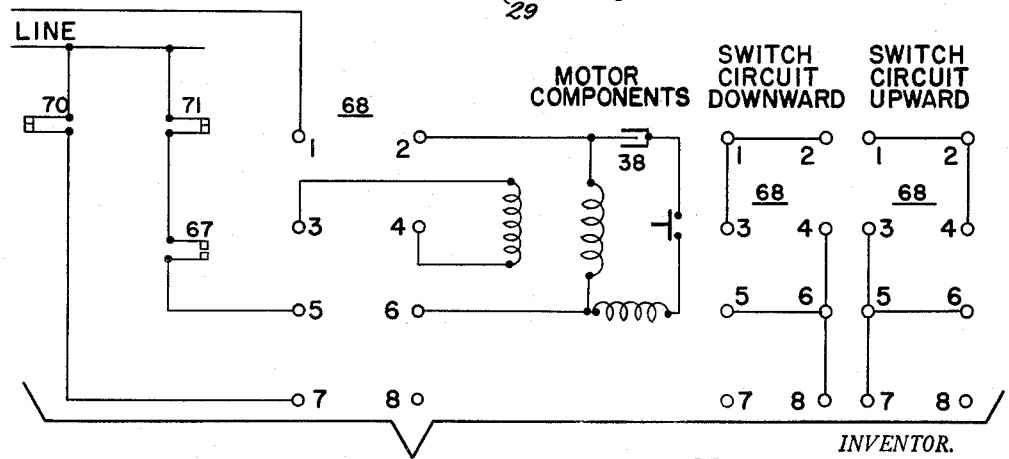
INVENTOR.
BERNARD R. HALPERN
BY
ATTORNEY March 16, 1954 B. R. HALPERN 2,672,197
PAPER-CUTTING MACHINE
Filed Feb. 2, 1950 5 Sheets-Sheet 3

INVENTOR.
BERNARD R. HALPERN
BY
ATTORNEY

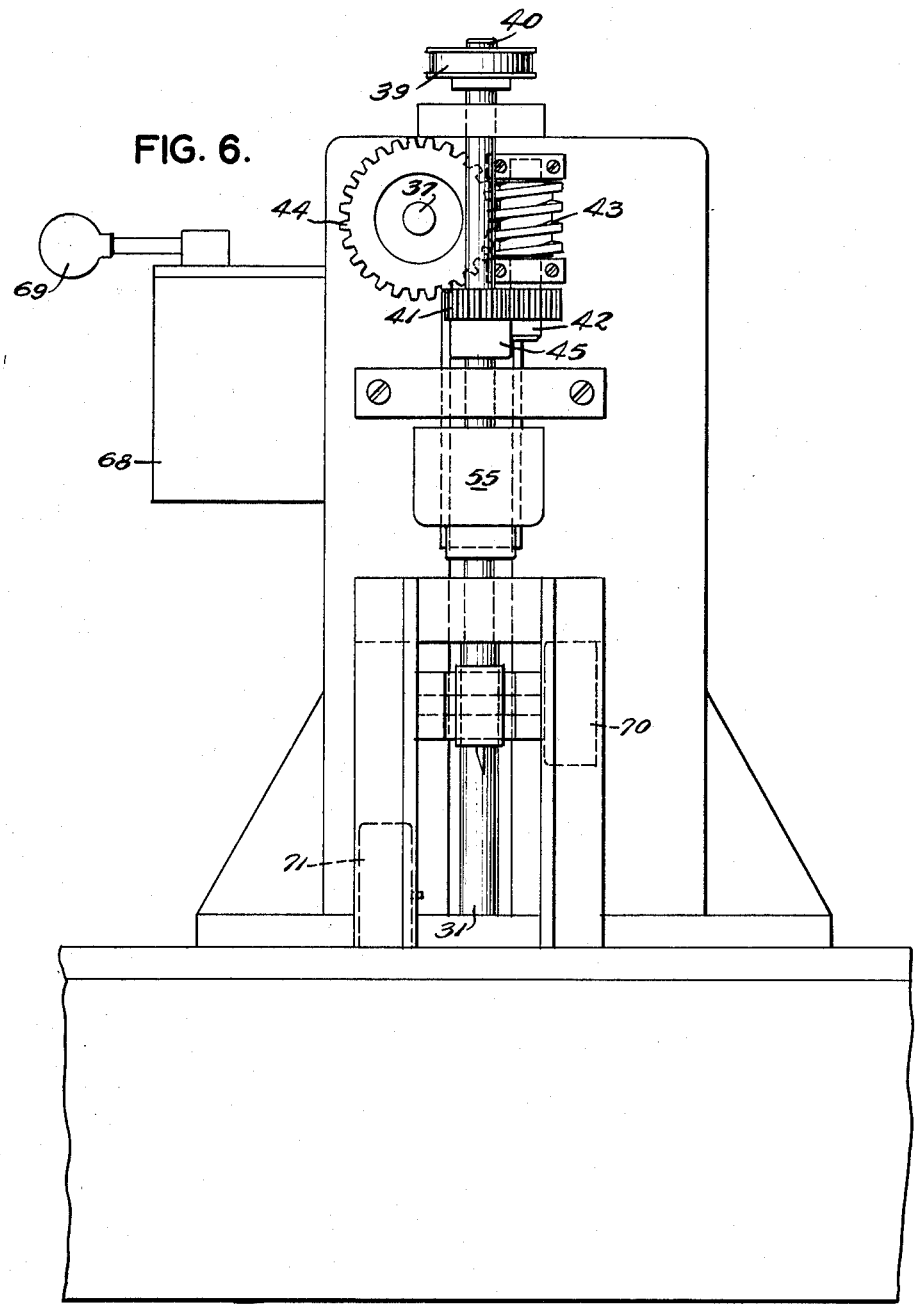

March 16, 1954  B. R. HALPERN  2,672,197
PAPER-CUTTING MACHINE

Filed Feb. 2, 1950  5 Sheets-Sheet 5

INVENTOR.
BERNARD R. HALPERN
BY
ATTORNEY

Patented Mar. 16, 1954

2,672,197

UNITED STATES PATENT OFFICE 2,672,197

PAPER-CUTTING MACHINE

Bernard R. Halpern, New York, N. Y.

Application February 2, 1950, Serial No. 141,882

17 Claims. (Cl. 164—55)

1

The invention herein disclosed relates to paper cutters and primary objects of the invention are to provide a machine of this nature which while capable of cutting a full height pile of paper will be light in weight, as distinguished from the heavy machines now in use, and readily portable so that it may be transported and shifted about as circumstances require.

Particularly it is a purpose of the invention to provide this machine in a simple, compact, self-contained form suited to portability and strong enough to carry the loads imposed by cutting operations and the strain and wear occasioned by handling and shipment.

Further objects of the invention are to provide the machine in a form meeting all the above requirements and which will be accurate in its operation and easily adjusted and controlled.

Further special objects of the invention are to safeguard and protect both the machine and the operator so that the machine will not be injured by improper or careless use and so that the operator will be protected against injury from careless or thoughtless actions in the handling of the machine.

Additional important objects of the invention are to improve the cutting action, to enable the cutting of tougher materials with the same facility as the lighter papers and to avoid such wear as ordinarily requires replacement of parts, such as the customary wood sticks generally used with the ordinary cutting blades.

Other desirable objects attained by the invention will appear or are set forth in the following specification.

The drawings accompanying and forming part of the specification are illustrative of the present preferred embodiment of the invention. Structure, however, may be modified and changed as regards the immediate illustration, all within the true intent and broad scope of the invention as hereinafter defined and claimed.

Fig. 1 in the drawings is a side elevation of one of the new cutting machines;

Fig. 2 is a top plan view with a portion of the cutting table broken away to show the screw feed mechanism forming part of the same;

Fig. 3 is a front end elevation of the machine with portions broken away and in section to show a part of the gearing for raising and lowering the clamp;

Fig. 5 is a further enlarged broken sectional detail of the knife reciprocating mechanism, on substantially the plane of line 5—5 of Fig. 4;

Fig. 6 is a broken side elevation of the central portion of the machine showing the knife reciprocating and lowering gearing;

Fig. 8 is a simplified form of wiring diagram showing the electrical circuits used in the machine.

Figure 4:
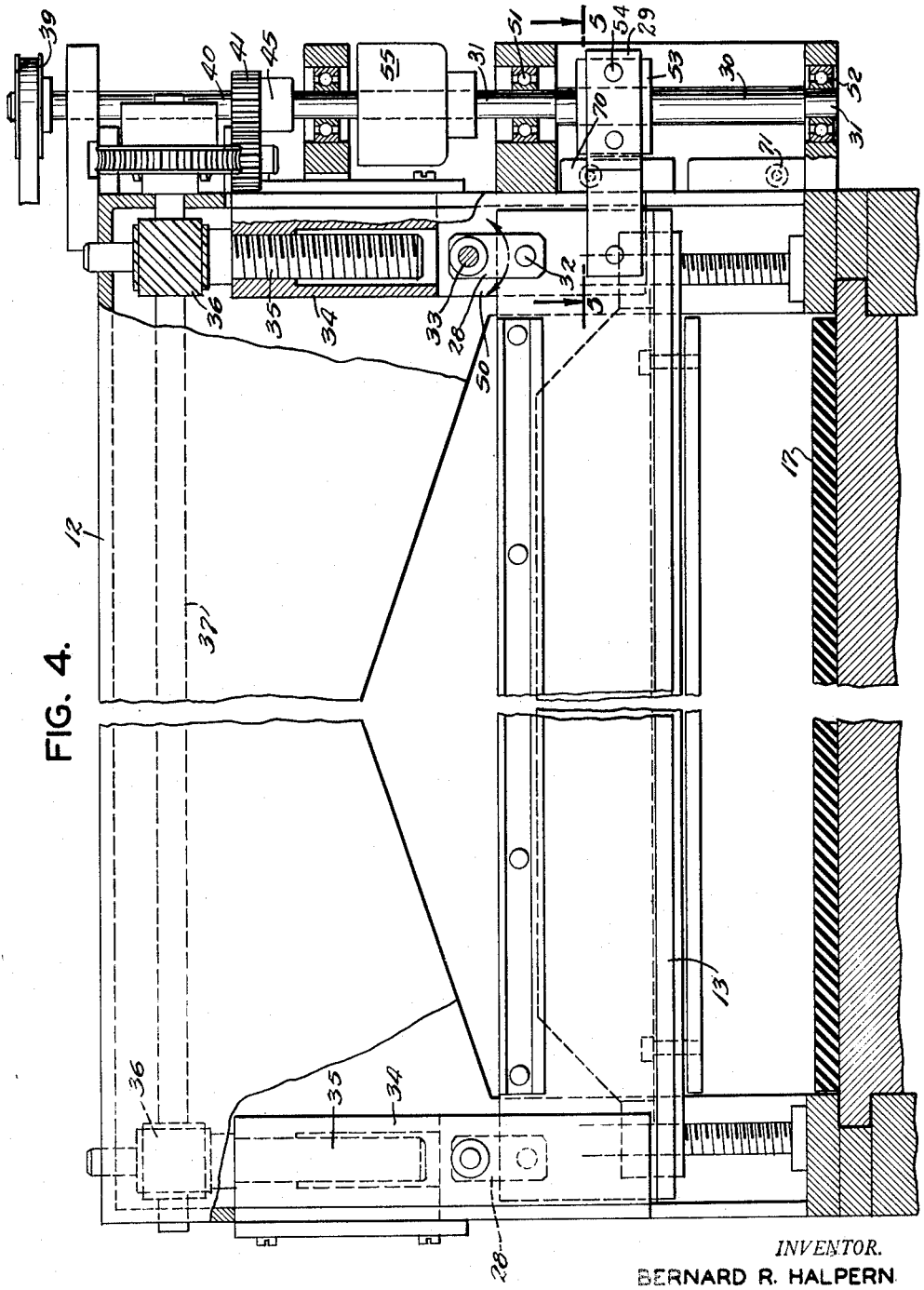
Fig. 4 is a cross sectional view of the machine on an enlarged scale, on substantially the plane of line 4—4 of Fig. 2.

The machine as here shown comprises a bed or base 10, carrying a cutting table 11 and provided intermediate its ends with a bridge or arch structure 12 carrying the cutting knife 13.

The base may be a cast or fabricated structure, stiff and strong enough to carry the various loads to which the machine may be subjected, and for ready portability it may be equipped with caster rolls or wheels which may be lowered for use and raised up into the base when not in use.

The table is shown in Fig. 3 as ridged or ribbed at 14 to stiffen and strengthen it, with these ribs guided in grooves 15 in the bed and the table riding on rollers 16 sunk in the bed beneath the paper clamping line.

The carriage is shown equipped with a blanket 17 of rubber, plastic or equivalent resilient material and with a gage 17 for the back edge of the paper.

Side gages 18 and 19 are provided on the base at opposite sides of the table.

Adjustment of the table is effected by a hand wheel 20 on a shaft 21 journaled across the front end of the base and geared at 22 to screw shafts 23 engaged with nut blocks 24 on the sides of the table carriage.

To indicate and facilitate adjustments of the table, the hand wheel shaft 21 is indicated as geared at 25 to a counter 26, Figs. 2 and 3, graduated or scaled to show distances from the back gage 17' to the cutting line of the knife 13.

The knife 13 differs from the conventional in that it is a light, thin blade braced only by an angle bar 27 across the upper edge.

The reason such a light blade can be employed is that instead of being operated as a power shear, it is vibrated or reciprocated to slice the material only one or a few layers at a stroke and lowered as it slices its way down through the pile.

This reciprocating, slicing action of the knife is effected in the illustration, by suspending the blade at opposite ends on swinging links 28 and by connecting the blade through a yoke 29 with an eccentric 30 on upright shaft 31 journaled at one end of the arch 12.

The swinging links 28, pivotally connected at their lower ends at 32 with the blade, are utilized to effect the lowering of the blade by being pivotally connected at their upper ends at 33 with screw sleeves 34 engaged on screw shafts 35 geared at 36 to opposite ends of a screw shaft 37 driven through reduction gearing from the same motor 38 which drives the reciprocating blade.

The reduction gearing comprises in the illustration, the V-belt drive connection 39 from the motor to the shaft 40 which is connected with the eccentric shaft 31 and spur gearing 41 from that shaft to shaft 42, Fig. 6, carrying the worm 43 in mesh with worm gear 44 on the cross shaft 37.

The motor driven shaft 40 is coupled with the knife lowering gearing through a yielding connection indicated in Figs. 4 and 6 as a slip clutch 45 in the gearing 41 adapted to stop the lowering movement in the event of the blade striking an obstruction or encountering too much resistance.

The screw sleeves 34 which carry the swinging knife supporting links are shown in Figs. 4 and 5, as having reduced portions 46 at their lower ends slidingly operating in vertical guide slots 47 in the end walls 48 of the arch structure, slidingly holding them against relative rotation on the screw shafts 35, and the yoke 29 is shown as having a parallel sided shank portion 49 slidingly operating in the parallel sided guideway 50 in the lower portion 34 of the sleeve adjacent the eccentric shaft 31. Thus the screw sleeves 34 are slidingly held against rotation and they in turn slidingly guide the swinging links 28 and the reciprocating yoke 29.

The eccentric 30 is elongated on the shaft 31 between upper and lower bearings 51, 52, Fig. 4, to accommodate the raising and lowering movements of the knife and connection to the knife is made by way of a block 53, Fig. 5, rotatably engaged over the eccentric and slidingly engaged on rods 54 crossing the arms of the yoke at opposite sides of the eccentric.

To prevent reciprocation when the knife is being raised, an overrunning clutch 55 is interposed as a one-way coupling between motor drive shaft 40 and eccentric shaft 31. Thus when the motor is reversed to lift the knife it will be raised without imparting the reciprocating slicing movement thereto.

The hold-down clamp for the paper is shown in the form of a clamp bar 56 carried by nut blocks 57 engaged on screw shafts 58 at opposite ends of the arch and connected by sprocket gearing 59 with an upright shaft 60 journaled in the center of the arch. This shaft is shown as having a hand wheel 61 thereon coupled through spring tensioned clutch discs 63 with the sprocket gearing 59 for the clamp bar raising and lowering mechanism.

With this construction the clamp bar may be raised and lowered at will through operation of the hand wheel 61, but the manual clamping pressure which can be applied is limited to a safe extent by the friction slip clutch at 63.

Figure 7:
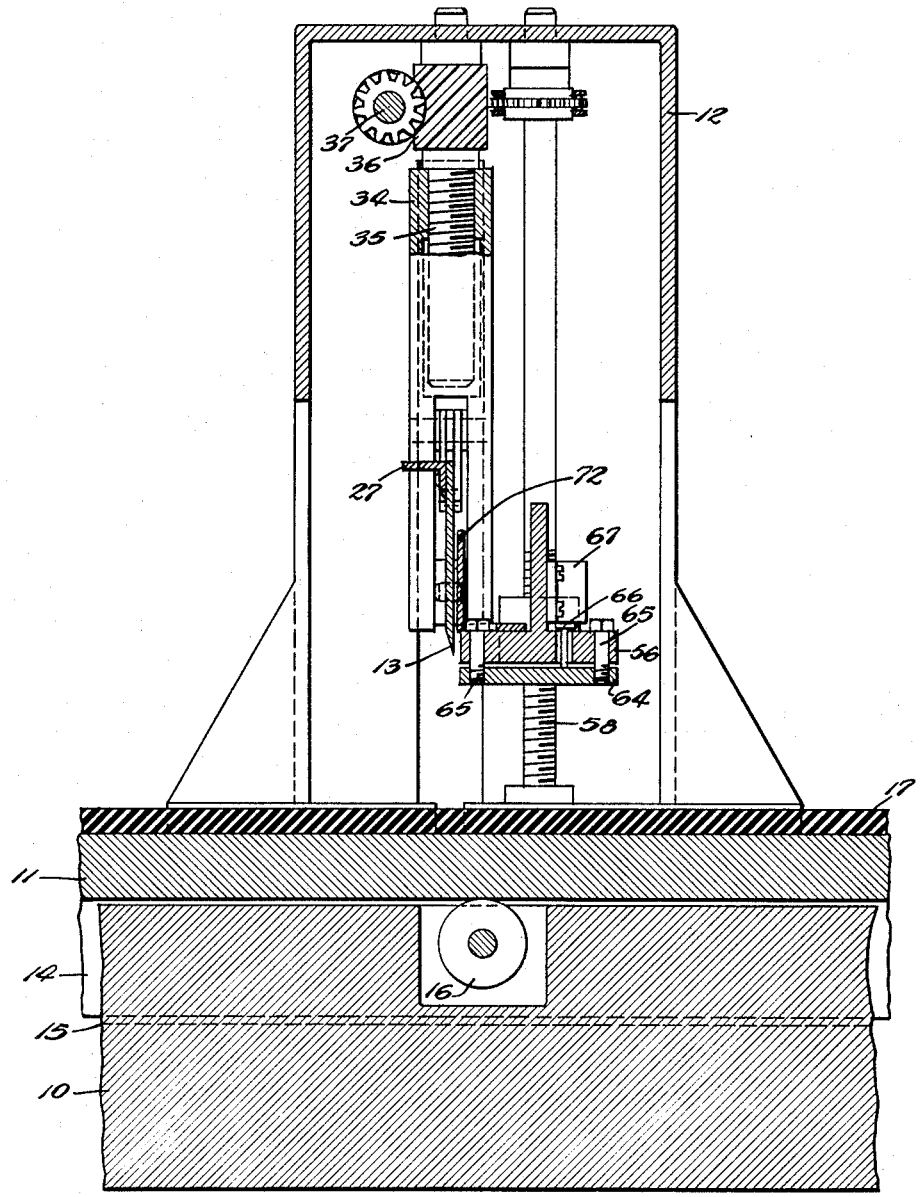
Fig. 7 is a broken vertical cross sectional view on substantially the plane of line 7—7 of Fig. 3, showing particularly the knife supporting and lowering gearing and details of the clamp bar mechanism.

To prevent operation of the cutter before the paper is properly held, the clamp bar is shown equipped with a face or feeler bar 64, Fig. 7, loosely suspended on bolts 65 sliding through the body of the clamp bar and carrying a plunger 66 for operating the microswitch 67 mounted on said bar. This microswitch is connected in the main circuit of the motor 38 so that the motor will not operate to drive and lower the blade until the clamp bar has been lowered sufficiently to fully grip and hold the pile of paper to be cut.

Operation of the machine is controlled in the illustration, by an automatic stop controller 68 having a control handle 69 which when not held will automatically return to "neutral" or "stop" position. The electrical connections to the motor are such that when handle 69 is shifted in one direction the motor will turn to lower and reciprocate the blade and will continue so just so long as the handle is held in this position. When released the handle will snap back to "stop" position.

Further, the electrical connections include motor reversing contacts and a holding relay or equivalent through which the control handle, when shifted in the opposite direction, will reverse the motor to effect lift of the blade and continuance of this lifting action until the blade is fully lifted to its extreme upper position.

During such lifting action the blade will not be reciprocated because in such reverse movement the overrunning clutch 55 will be ineffective to impart reciprocatory movement to the blade. Thus the blade is lifted quickly and quietly without any vibratory motion and without any attention on the part of the operator.

The foregoing are desirable safety factors.

The operator must hold the control handle in the downward cutting position to maintain the machine in cutting operation. The machine will immediately and automatically stop upon release of this handle, and if at any time it is desired to release and lift the blade this can be effected by simply pushing the handle over to the opposite, reverse position, whereupon the control connections effect the complete quick lifting of the blade without reciprocating it and without any further attention on the part of the operator.

To automatically stop the machine at the end of the blade lifting operation, a microswitch is shown provided at 70, Figs. 4 and 6, positioned to be engaged and actuated by the yoke 29 at the upper end of the knife movement. This switch may be interposed either directly or indirectly in the motor controlling circuit.

Similarly, a motor controlling microswitch 71 is shown positioned to be engaged and operated by the yoke 29 at the lower end of the blade travel. This last mentioned limit switch is preferably located to stop the motor operation after the blade has just sliced through the sheet at the bottom of the stack and is ready to or begins to cut into the surface of the blanket 17.

The latter may be of relatively soft, resilient rubber, since both the holding pressure and the cutting pressure need not be heavy. The knife blade in its oscillating and reciprocating motion, only cuts through one or a few sheets at a time and so needs not apply any heavy pressure and, accordingly, the clamp does not have to hold the pile under any particularly heavy pressure. With this downward sliding, sheet-to-sheet slicing operation, the blade does not have to travel to any great downward extent at each stroke and so can cut through the last sheet practically or almost without penetrating the rubber. And, if it does cut into the surface, the incision is so slight as to practically not affect the rubber and to enable it, for all practical purposes, to automatically close the cut. This factor enables the blanket to be continued in service almost indefinitely without impairment and without need for replacement.

The various safety factors disclosed are particularly important.

The slip clutch 63 in the manual clamp setting gearing prevents application of too much pressure to the clamp bar.

The machine, through the medium of the switch 67 controlled by the facing plate 64 on the clamp bar, cannot be started until the clamp is properly set on the pile of paper.

Once started, the machine will only continue in operation so long as the handle 69 is held in the cutting position, and then it will only run until the knife is lowered to the bottom of the pile, whereupon microswitch 71 will stop the motor.

If at any time the motor running handle 69 is released, it will automatically return to neutral position and stop the machine.

If the blade encounters an obstruction or too much resistance to its operation, the slip clutch 45 automatically releases, stopping the blade lowering operation and preventing further downward movement until the obstruction is removed or overcome or the resistance reduced.

In case of a sudden emergency and need to raise the knife, the control handle may be simply thrown over to reverse position and, without holding it over, the motor will be reversed to fully lift the blade without reciprocating it and without stopping until automatically stopped through operation of the upper limit switch 70.

To further safeguard the operator the clamp bar or beam 56 is shown as carrying a guard 72, Fig. 7, extending closely up in back of the knife so as to leave practically no space between the knife and beam when the latter is lowered, ready for starting the machine.

The oscillating, slicing operation enables the knife to cut tough paper stock such as used for maps and charts, as well as the lighter grades of paper, and this slicing type of operation permits the knife to be continued in effective, clean cutting operation even after it may have a number of nicks therein, particularly if they are small, since these small nicks, by reason of the reciprocating cutting action, will not create observable ridges in the cut face of the pile, such as occasioned by machines of the shear cut type.

The machine is light in weight for the work performed and of simple, compact, strong construction, with no projecting parts and therefore well suited to the handling required of a portable machine. The operation is smooth, accurate and safe.

The reciprocating slicing action of the knife renders it effective in the stroke in both directions and this, together with the facts that it is so light and so well controlled it can be reciprocated at high speed, enables the cutting to be effected at a rapid rate. Furthermore, the slicing operation does not require heavy pressure of the knife and hence the load on the motor is light and a low power, light weight motor may be employed. These factors all contribute to a machine of reasonably low cost.

The swinging suspension imparts an oscillatory, up and down movement in the reciprocatory action of the knife, providing an effective slicing stroke. This effectiveness permits use of a short stroke eccentric, reducing loads on the motor and gearing and cutting down vibration. This short stroke operation also permits the motion communicating block 53, Figs. 4 and 5, to slide easily and smoothly without binding, up and down over the elongated eccentric 30 as the blade is raised and lowered.

The hand wheel 20 for adjusting the paper cutting table is conveniently located at the front of the machine. Also, the controller 68 for effecting forward and reverse drive of the motor is located at the front side of the arch 12. The motor and drive gearing therefrom are located on the opposite side or the back of the arch, away from the operator, another safety factor.

What is claimed is:

1. A paper cutting machine as disclosed herein comprising a supporting base, a paper cutting table on said base, a clamp for holding a pile of paper on said table, a substantially horizontally disposed paper slicing knife, means supporting said knife for substantially horizontal longitudinally reciprocating slicing engagement with a pile of paper held by said clamp, means for imparting rapid, horizontally reciprocating, paper slicing movements to said knife and means for automatically lowering said knife supporting means as the knife slices its way down through the pile, said means for imparting reciprocating movement to the knife including a motor and a switch controlling operation of the same and a pile engaging member movably mounted on the clamp in position for engagement with the pile of paper on the table and operable by engagement with the pile to effect actuation of said switch and whereby said motor will be effective to reciprocate the knife only when the clamp is in holding engagement with the pile of paper.

2. A paper cutting machine as disclosed herein comprising a supporting base, a paper cutting table on said base for supporting a pile of paper, a substantially horizontally disposed, paper slicing knife, means supporting said knife for substantially horizontal longitudinally reciprocating slicing engagement with a pile of paper on said table, means for imparting rapid, horizontally reciprocating, paper slicing movements to said knife and means for automatically lowering said knife supporting means as the knife slices its way down through the pile, said means for imparting reciprocating movement to the knife including reversing gearing having a one-way drive overrunning clutch operative to reciprocate the knife only in the operation of said gearing in one direction.

3. A paper cutting machine as disclosed herein comprising a supporting base, a paper cutting table on said base for supporting a pile of paper, a substantially horizontally disposed paper slicing knife, means supporting said knife for substantially horizontal longitudinally reciprocating slicing engagement with a pile of paper on said table, means for imparting rapid, horizontally reciprocating, paper slicing movements to said knife and means for automatically lowering said knife supporting means as the knife slices its way down through the pile, said means for imparting reciprocating movement to the knife including reversing gearing having a one-way drive overrunning clutch operative to reciprocate the knife only in the operation of said gearing in one direction, and connecting gearing for driving said lowering means in both directions and said gearing arranged to effect reciprocation of the knife only in the lowering movement of the same.

4. A paper cutting machine as disclosed herein comprising a supporting base, a paper cutting table on said base for supporting a pile of paper, a substantially horizontally disposed paper slicing knife, means supporting said knife for substantially horizontal longitudinally reciprocating slicing engagement with a pile of paper on said table, means for imparting rapid, horizontally reciprocating, paper slicing movements to said knife, means for automatically lowering said knife supporting means as the knife slices its way down through the pile, a motor connected and arranged to effect the reciprocation and lowering movements of said knife and limit switches operable at extreme upper and lower positions of said knife to stop said motor.

5. A paper cutting machine as disclosed herein comprising a supporting base, a paper cutting table on said base for supporting a pile of paper, a substantially horizontally disposed paper slicing knife, means supporting said knife for substantially horizontal longitudinally reciprocating slicing engagement with a pile of paper on said table, means for imparting rapid, horizontally reciprocating, paper slicing movements to said knife, means for automatically lowering said knife supporting means as the knife slices its way down through the pile, a motor for effecting reciprocatory and raising and lowering movements of said knife and a controller for said motor biased in the stopping position and arranged when shifted and held to one side to effect lowering of the knife and when momentarily shifted in the opposite direction, to effect complete raising of the knife.

6. A paper cutting machine as disclosed herein comprising a supporting base, a paper cutting table on said base for supporting a pile of paper, a substantially horizontally disposed paper slicing knife, means supporting said knife for substantially horizontal longitudinally reciprocating slicing engagement with a pile of paper on said table, means for imparting rapid, horizontally reciprocating, paper slicing movements to said knife, means for automatically lowering said knife supporting means as the knife slices its way down through the pile, a motor for effecting reciprocatory and raising and lowering movements of said knife and a controller for said motor biased in the stopping position and arranged when shifted and held to one side to effect lowering of the knife and when momentarily shifted in the opposite direction, to effect complete raising of the knife, and a limit switch for stopping operation of the motor when the knife is raised to a predetermined upper limit of travel.

7. A paper cutting machine as disclosed herein comprising a supporting base, a paper cutting table on said base for supporting a pile of paper, a substantially horizontally disposed paper slicing knife, means supporting said knife for substantially horizontal longitudinally reciprocating slicing engagement with a pile of paper on said table, means for imparting rapid, horizontally reciprocating, paper slicing movements to said knife, means for automatically lowering said knife supporting means as the knife slices its way down through the pile, and common drive means for effecting raising and lowering and reciprocating movements of the knife, including a slip clutch for limiting the lowering action of the knife and an overrunning clutch arranged to discontinue reciprocation on the lifting movement of the knife.

8. A paper cutting machine as disclosed herein comprising a supporting base, a paper cutting table on said base for supporting a pile of paper, a substantially horizontally disposed paper slicing knife, means supporting said knife for substantially horizontal longitudinally reciprocating slicing engagement with a pile of paper on said table, means for imparting rapid, horizontally reciprocating, paper slicing movements to said knife, means for automatically lowering said knife supporting means as the knife slices its way down through the pile, said means for imparting reciprocation to the knife including an elongated eccentric mounted at one end of the knife, a power transmitting block slidable over said eccentric in accordance with the raising and lowering movements of the knife, and a yoke connected with the knife and having spaced arms about said block and slidingly connected with the block on an axis of movement at right angles to the longitudinal axis of the knife.

9. A paper cutting machine comprising a base, a paper cutting table on said base, a clamp bar overstanding said table, feed screw shafts engaged with opposite ends of said clamp bar, a face plate loosely connected with said clamp bar, a switch on said clamp bar and arranged for operation by lifting movements of said face plate, a paper cutting knife mounted for cooperation with a pile held by said clamp, a motor for driving said knife and connections from said switch to said motor for rendering said motor ineffective until said face plate is lowered by the clamp bar into engagement with a pile of sheets to be cut.

10. A paper cutting machine comprising a base, a paper cutting table on said base, an arch on the base extending over said table, said arch having vertical guides in the opposite sides of the same, screw sleeves operable in said guides, feed screws engaged with said sleeves for effecting raising and lowering of the same, a paper slicing knife extending across the table between said sleeves, swinging links pivotally connecting said knife with said sleeves and knife reciprocating means connected with said knife.

11. A paper cutting machine comprising a base, a paper cutting table on said base, an arch on the base extending over said table, said arch having vertical guides in the opposite sides of the same, screw sleeves operable in said guides, feed screws engaged with said sleeves for effecting raising and lowering of the same, a paper slicing knife extending across the table between said sleeves, swinging links pivotally connecting said knife with said sleeves and knife reciprocating means connected with said knife, including a yoke connected to the knife and having spaced arms projecting away from the knife, parallel guide pins carried by said arms, a block slidably engaged on said pins and an eccentric extending through said block and slidably engaged thereby.

12. A paper cutting machine comprising a base, a paper cutting table on said base, an arch on the base extending over said table, said arch having vertical guides in the opposite sides of the same, screw sleeves operable in said guides, feed screws engaged with said sleeves for effecting raising and lowering of the same, a paper slicing knife extending across the table between said sleeves, swinging links pivotally connecting said knife with said sleeves and knife reciprocating means connected with said knife, including a yoke connected to the knife and having spaced arms projecting away from the knife, parallel guide pins carried by said arms, a block slidably engaged on said pins and an eccentric extending through said block and slidably engaged thereby, said screw sleeves having parallel sided guideways in the lower end portions of the same in which said swinging links and yoke are slidingly guided.

13. A paper cutting machine comprising a base, a paper cutting table on said base, an arch on the base over said table, a knife supported and guided for raising and lowering and longitudinal reciprocating movements in said arch, a shaft at one end of said arch and provided with means for effecting reciprocation of said knife and means for driving said shaft including a one-way clutch for imparting reciprocation to the knife in the downward movement of the same and for leaving the knife free of reciprocation in the upward movement of the same.

14. A paper cutting machine comprising a base, a paper cutting table on said base, an arch on the base over said table, a knife supported and guided for raising and lowering and longitudinal reciprocating movements in said arch, a shaft at one end of said arch and provided with means for effecting reciprocation of said knife and means for driving said shaft including a one-way clutch for imparting reciprocation to the knife in the downward movement of the same and for leaving the knife free of reciprocation in the upward movement of the same, a reversible motor for driving said last means, gearing from said motor to effect the raising and lowering movements of the knife and a reversing controller for said motor.

15. A paper cutting machine comprising a base, a paper cutting table on said base, an arch on the base over said table, a knife supported and guided for raising and lowering and longitudinal reciprocating movements in said arch, a shaft at one end of said arch and provided with means for effecting reciprocation of said knife and means for driving said shaft including a one-way clutch for imparting reciprocation to the knife in the downward movement of the same and for leaving the knife free of reciprocation in the upward movement of the same, a reversible motor for driving said last means, gearing from said motor to effect the raising and lowering movements of the knife and a reversing controller for said motor, said controller being biased to "off" position and being operable when held in one direction to effect lowering and reciprocatory movements of the knife and when shifted in the opposite direction, to maintain the motor operative to fully lift the knife in non-reciprocating condition.

16. A paper cutting machine comprising a base, a cutting table on said base, an arch on the base over said table, a paper slicing knife supported for raising and lowering and reciprocating movements on said arch, means for imparting reciprocating movement to said knife and shiftable with said knife in the up and down movements of the same, a motor for effecting said reciprocating and up and down movements of the knife and limit switches for said motor operable by said knife reciprocating means in the vertical travel of the same effected by the knife.

17. A paper cutting machine comprising a base, a paper cutting table thereon, an arch on said base over said table, a paper slicing knife, means supporting said knife for vertical and reciprocatory movements in said arch, a motor mounted on one side of the arch, drive connections from said motor for effecting the vertical and reciprocatory movements of said knife and a controller for effecting forward and reverse operations of said motor mounted on the opposite side of said arch.

BERNARD R. HALPERN.

References Cited in the file of this patent

UNITED STATES PATENTS

| Number | Name | Date |
| --- | --- | --- |
| Re. 7,612 | Schlenker | Apr. 17, 1877 |
| 680,655 | Gray | Aug. 13, 1901 |
| 893,166 | Hand | July 14, 1908 |
| 1,502,120 | Rosmussen | July 22, 1924 |
| 1,745,958 | Stegmann | Feb. 4, 1930 |
| 1,955,004 | Lodge | Apr. 17, 1934 |
| 2,071,402 | Hazelton | Feb. 23, 1937 |
| 2,132,136 | Tucker | Oct. 4, 1938 |
| 2,230,802 | Klein | Feb. 4, 1941 |
| 2,451,636 | Spiller | Oct. 19, 1948 |

FOREIGN PATENTS

| Number | Country | Date |
| --- | --- | --- |
| 645,970 | Germany | June 9, 1937 |
| 4,862 | Great Britain | Dec. 21, 1877 |